Figure 2:
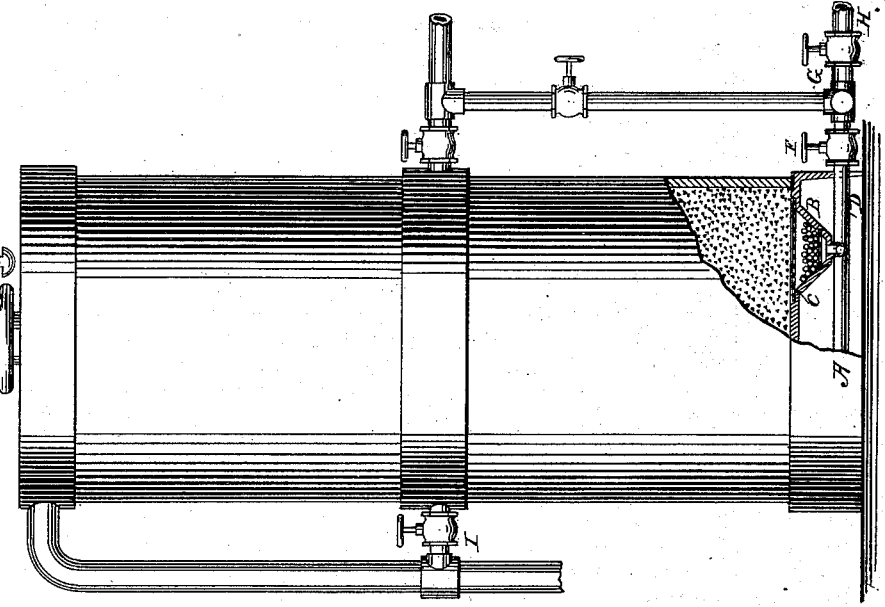

(No Model.)

J. W. HYATT.
ART OF FILTRATION.

No. 409,970. Patented Aug. 27, 1889.

WITNESSES
George Cook
Edward Wolff

INVENTOR
John W. Hyatt

UNITED STATES PATENT OFFICE.

JOHN W. HYATT, OF NEWARK, NEW JERSEY, ASSIGNOR TO THE NEWARK FILTERING COMPANY, OF SAME PLACE.

ART OF FILTRATION.

SPECIFICATION forming part of Letters Patent No. 409,970, dated August 27, 1889.

Application filed September 7, 1885. Renewed May 14, 1886. Serial No. 202,221. (No model.)

*To all whom it may concern:*

Be it known that I, JOHN W. HYATT, a citizen of the United States, and a resident of Newark, in the county of Essex and State of New Jersey, have invented certain new and useful Improvements in the Art of Filtration, of which the following is a specification.

The invention relates to improvements in the art of filtration; and it consists, essentially, in a novel method of removing the impurities from the filter-bed in such manner that a small portion only of the whole body of the filtering medium is subjected to the cleansing process at the same time.

In practicing the invention I use an arrangement of inlets and pipes in the base of a filter containing a bed of filtering material in granular or comminuted form, whereby the current of water may be reversed through the filter and directed through certain portions of the inlets against definite parts of the bed at a time until the whole has been partially cleansed and softened or agitated, when the water will be permitted to pass into the filter through all of the inlets simultaneously and complete the washing of the granular or comminuted material.

Heretofore great difficulty has been experienced in cleansing large filter-beds of granular or comminuted material by reversing the current of water so that it entered the base of the bed through numerous inlets, (which during the operation of filtering formed outlets,) owing to the facts that the pressure and quantity of water remained unchanged, unless special means were employed to increase them; that the bed became in a manner solidified from the previous direction of the current and the arrested silt and other impurities; that the resistance to the current offered by the bed was so great that the elements of the latter could not speedily, effectually, and satisfactorily be agitated and cleansed by the water alone, and that the effective force of the current was in a great degree dissipated and lost by being distributed over a large area.

It is the object of the present invention to obviate the foregoing difficulties and objections to certain modes of cleansing filter-beds, and to afford an effective method whereby the reversed current under its usual pressure may be utilized to thoroughly wash the elements of the bed and remove the impurities. It is true that the volume of water in the reversed current could be sufficiently increased to agitate the whole filter-bed; but under such condition the current would be so violent that the sand would be carried from the filter by it.

Figure 1:
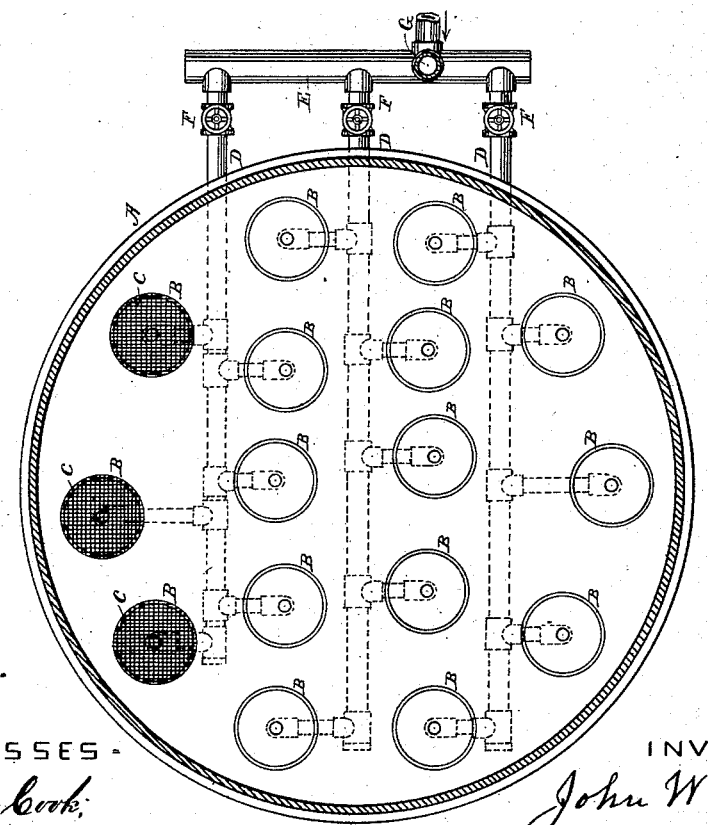

In the accompanying drawings I illustrate the invention applied to one of the filters described in Letters Patent of the United States No. 322,103, issued to me July 14, 1885, Figure 1 being a plan view of the base of the filter, and Fig. 2 a side elevation, partly in section, of same. It must be understood, however, that the invention is not limited in its application to the filter shown, nor to a filter of any special construction, it being the only essential consideration that at the base of the bed of granular or comminuted material a series of openings be provided in communication with a set of properly-arranged pipes having valves and connected by a cross-head or otherwise with the pipe through which the reversed current passes, and that an escape above the filter-bed be furnished for waste water and impurities.

In the drawings, A designates the base of the filter; B, a series of hollow conical formations opening upward and protected against the entrance of elements of the bed by wire-cloth or perforated metal C; D, a series or set of pipes communicating, respectively, with certain of the cones and being connected outside of the filter with a cross-head E; F, independent valves in the pipes D, and G the main pipe through which the reversed current passes to the cross-head E, whence it enters such of the pipes D as may be open and is delivered into the base of the filter-bed through the cones B in communication with such open pipes.

During the operation of filtering, the pipe G will be closed and all of the pipes D opened, and the water will enter the filter above the bed, down through which it will pass, (the impurities being arrested in transit,) and escape in a purified condition through the cones B, pipes D, and delivery-pipe H. When, however, it is desired to wash the filtering media, the current will be directed through the pipe G, cross-head E, pipes D, and cones D into the bed, as above described, it being permitted to escape with the impurities through the waste-pipe I.

In practicing my invention, in lieu of causing the reverse current to pass into and issue from all of the cones B simultaneously, I direct it through one or more of the pipes D and the cones connected with it or them at a time, whereby the full force of the current is brought to act upon that portion only of the filter-bed directly over the special cones from which the water is passing, and hence said portion of the bed, not offering a greater resistance than the pressure of the current, will be loosened and cleansed, after which the water will be directed through another set of the cones B until the bed above them has been purified, and then through another set, and so on until the bed has been wholly or in greater part effectually agitated and cleansed, whereupon all of the valves in the pipes D will be opened, permitting the water to pass through all of the cones simultaneously and completing the washing process, after which the current will be directed into the apparatus above the filter-bed and the operation of filtering proceeded with as before.

It will be observed that I utilize the full force of the current on but a definite portion of the filter-bed at a time, and I am thus enabled to thoroughly wash the sand or other granular or comminuted material without the employment of mechanical means for agitating the bed or increasing the pressure or volume of the water in the reversed current.

I do not herein claim the apparatus described in Letters Patent No. 359,258, granted to me March 15, 1887.

What I claim as my invention, and desire to secure by Letters Patent, is—

1. In cleansing granular filter-beds, the method of removing the impurities therefrom in such manner that a small portion only of the whole body of the filtering medium is subjected to the cleansing process at the same time, which method consists in reversing the current through the filter-bed and directing the full force of the current first against one portion of the bed and then against another, and so on until the whole has been agitated and cleansed, substantially as set forth.

2. In cleansing granular filter-beds, the method of removing the impurities therefrom in such manner that a small portion only of the whole body of the filtering medium is subjected to the cleansing process at the same time, which method consists in reversing the current through the filter-bed and directing the full force of the current first against one portion of the bed and then against another, and so on until the whole has been agitated and thoroughly or partially cleansed, and finally directing the current against the whole of the bed at the same time, substantially as set forth.

Signed at New York, in the county of New York and State of New York, this 27th day of August, A. D. 1885.

JOHN W. HYATT.

Witnesses:
   CHAS. C. GILL,
   GEORGE COOK.